United States Patent [19]

Drebot

[11] Patent Number: 4,563,832

[45] Date of Patent: Jan. 14, 1986

[54] BAIT CONTAINER

[75] Inventor: Michael A. Drebot, Bedford, Canada

[73] Assignee: Her Majesty the Queen in right of Canada, as represented by the Province of Nova Scotia, Nova Scotia, Canada

[21] Appl. No.: 486,578

[22] Filed: Apr. 19, 1983

[30] Foreign Application Priority Data

Feb. 15, 1983 [CA] Canada ................................. 1152745

[51] Int. Cl.⁴ ........................................... A01K 71/00
[52] U.S. Cl. ..................................... 43/44.99; 43/102
[58] Field of Search .................... 43/44.99, 102, 41, 4, 43/100; 239/34, 58; 206/0.5; 383/9, 68, 117, 8, 30, 31, 42, 78, 79, 81, 92, 906

[56] References Cited

U.S. PATENT DOCUMENTS

| | | |
|---|---|---|
| 2,452,553 | 11/1948 | Curtis, Jr. . |
| 2,555,088 | 5/1951 | Irwin ........................................ 43/41 |
| 2,602,261 | 7/1952 | Mann . |
| 2,607,155 | 8/1952 | Van der Clute ................... 43/44.99 |
| 2,726,478 | 4/1953 | Pullen ..................................... 43/100 |
| 2,765,575 | 10/1956 | Gfroerer ............................ 43/44.99 |
| 2,997,160 | 8/1961 | Marshall, Jr. . |
| 3,084,471 | 4/1963 | Alspaugh ........................... 43/44.99 |
| 3,143,153 | 8/1964 | Smith . |
| 3,176,427 | 4/1965 | Hershey . |
| 3,217,967 | 10/1966 | Jackson ................................. 383/81 |
| 3,722,786 | 3/1973 | Honn et al. ........................... 383/78 |
| 4,111,202 | 9/1978 | Theeuwes . |
| 4,218,843 | 8/1980 | Clarke, Jr. ............................ 206/0.5 |
| 4,232,471 | 11/1980 | Kolk et al. ......................... 43/44.99 |

FOREIGN PATENT DOCUMENTS 949358 2/1964 United Kingdom ............... 43/44.99

Primary Examiner—Nicholas P. Godici
Assistant Examiner—Maureen Weikert
Attorney, Agent, or Firm—Jones, Tullar & Cooper

[57] ABSTRACT

A bait container, particularly useful with crustacean (lobster or crab) traps is formed with an apertured side wall in which the apertures comprise at least 35% of the surface area of the side wall. The apertures for any container are usually uniform in size and the range of aperture size is from about 250 to about 1000 microns. The size and distribution of the apertures prolongs bait life due to the controlled release of bait from the container and the added protection against unwanted predators such as arthropods. Furthermore the bait container permits the use of emulsified or minced bait produced from previously undesirable material, such as discards and non-edible fish parts taken from the fish processing industry.

5 Claims, 4 Drawing Figures

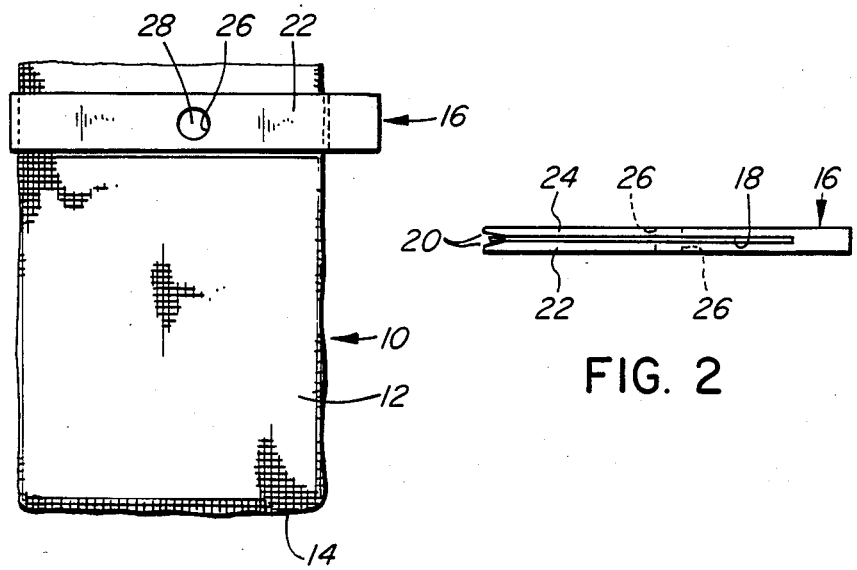
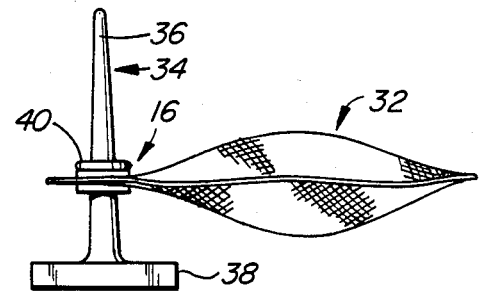
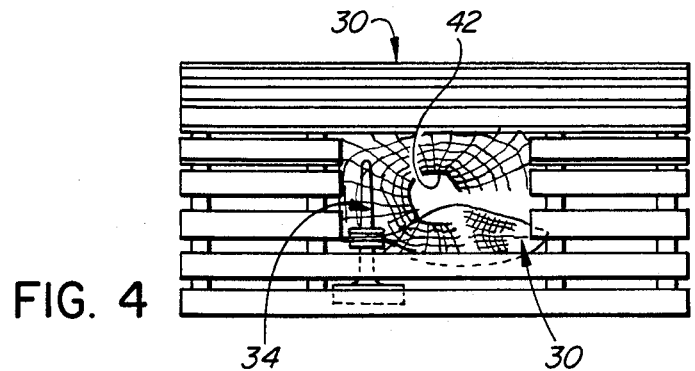

BAIT CONTAINER

The present invention relates in general to the fishing industry and more particularly to the crustacean fishing industry.

BACKGROUND TO THE INVENTION

In commercial fishing the fisherman is desirous of achieving the greatest "catch" at the least expense so as to keep his profit margin as high as possible. Included in items which affect his expenses are his direct costs respecting his operation, such as fuel, bait, equipment and employee costs. Also, weather changes and the distance he has to travel to an appropriate fishing locale can effect his catch. Essentially, the fisherman wants to maximize his catch on each trip so that his expenses do not outweigh the income he can realize from his catch.

As indicated above, one of the items which can affect a catch is the bait used to attract the quarry. Whether attempting to catch fish or crustaceans the fisherman wants to use the minimum amount of bait, at the least expense, possible. When fishing for crustaceans, such as lobster or crab, the fisherman wants his bait to last as long as possible. If the bait is long-lasting it means that the fisherman can set more traps, or range farther afield, without having to make frequent return visits to his traps for re-baiting. Also, it is very desirable, when the traps are left unattended for a week or so, to protect the bait so that it is not consumed by unwanted species and is thus still available to attract the desired species. Certainly, it is desirable to reduce bait expenses by utilizing bait material which has heretofore not been effective or utilizable due to the nature of prior art bait containers.

Perforated containers for holding bait during fishing operations are well known, see for example U.S. Pat. Nos. 2,607,155; 2,765,575; 3,084,471; and 4,232,471. Such patents teach, inter alia, cylindrical, rigid or flexible perforated containers each relying on a particular structural or functional advantage to distinguish patentably over the known art. However, the containers of those patents do not lend themselves to the lobster and crab industry as practiced in the Canadian and northern United States coastal regions. in particular, such containers have relatively large perforations (up to one inch or so) and they would not provide the desirable features enumerated above. The containers of those patents would not be useful when fishing extends over a week or more with the traps left unattended.

SUMMARY OF THE INVENTION

The present invention, on the other hand, does provide the advantageous features expressed above and does so at a reasonable cost. In particular the bait container for the present invention utilizes an apertured side wall of which the apertures therethrough comprise at least 35% of the side wall area. The apertures usually are uniform in size for any container and the range in perforation size is from about 250 to 1000 microns.

While the foregoing may not appear to be a considerable departure from the prior art, tests have shown that significant improvements and advantages result from the use of a bait container as described. In one particular form of the present invention the bait container may be in the form of a bag having a perforate or apertured side wall, with an open diameter of about 9 cm. and a length of about 15 cm. Such a bag, having the apertures or perforations thereof as defined hereinabove has shown to generate a proven baiting life of up to 12 days. Such a bag would be appropriate for the inshore lobster and crab fishery, while larger bags, containing greater amounts of bait, could be used for offshore fishing grounds where trap sets are longer and hauls are less frequent.

A bait container in accordance with the present invention may be produced from mesh, apertured or perforated natural or synthetic material. The bait container may hold conventional bait, such as whole or round fish; pieces and parts of fish, such as heads or viscera; or it may desirably be utilized to hold round fish, discards and post processing non-edibles that have been ground or minced. Such inexpensive bait could be used fresh or could be formulated with certain additives to produce, for example, an emulsified and homogeneous, salted, minced bait material. The latter type of bait, being extremely small in particle size, would be very effective with the present invention due to the extremely small size of the perforations through the side wall of the container.

In addition to being able to utilize inexpensive bait, the present invention will protect such bait from undesirable predators, such as small arthopods, commonly known as sand fleas. Since the bait is protected the traps can remain active over longer fishing periods as compared to traps utilizing conventional bait. This feature also permits the traps to be active during inclement weather when the fisherman is unable to reach his traps for re-baiting. Consequent to the above is the feature that the increased bait life and the longer baiting periods permits the fisherman to use less fuel and to thus reduce his expenses.

The use of a bait container according to the present invention will not only directly aid the fisherman but it will also directly aid the processing industry in that bait material can be processed from otherwise non-edible or discardable material. Furthermore, since more "discard" material could be used as bait material the otherwise edible parts, such as fillets, of fish previously used as bait will be available for further processing and marketing to the consumer. Thus, it is seen that many particular advantages can be obtained throughout the fishing and fish processing industry through utilization of the present invention.

BRIEF DESCRIPTION OF THE DRAWINGS

FIG. 1 shows the bait container of the present invention in elevation, as a flexible sided bag.

FIG. 2 shows a plan view of the clamping and securing device used in conjunction with the bait container of the present invention.

FIG. 3 shows a full bait bag according to the present invention mounted to a bait spindle.

FIG. 4 shows the assembly of FIG. 3 in position in a lobster trap.

DESCRIPTION OF THE PREFERRED EMBODIMENT

FIG. 1 shows the preferred form of the bait container of the present invention, namely as a bait bag 10. In this embodiment the bag is formed from flexible perforate material, generally in a tubular form so as to have a side wall 12 which is closed at one end, as at 14. If the material is of a plastic nature the closure may be obtained through heat sealing or through a compatible resin-based adhesive. The material of the side wall 12 is produced so that the perforations or apertures therethrough are uniform in size and the bag is produced so that at least 35% of the surface area of the entire side wall is represented by the perforations, the remainder being the material itself. The range of perforation size for an efficient bait container has been discovered to be from about 250 to 1000 microns, the optimum size depending on the water temperature, the physical size of the bait to be used, and the length of time that the trap is to be left unattended.

Tests have shown that results can be optimized when the size of the perforations is selected on the basis of water temperature. For example, and using emulsified or minced bait, containers having apertures or perforations in the 1000 to 800 micron size are most effective in cold water of about 0° C. to about 7° C. For higher temperatures the perforation size should be decreased in order to achieve the best results. Thus, for temperatures in the range of about 7° C. to about 13° C. the perforations should be in the range of about 800 to 600 microns; for temperatures in the range of about 13° C. to about 18° C. the perforations should be in the range of about 600 to 450 microns; and for temperatures greater than about 18° C. the perforations should be in the range of about 450 to 250 microns. As previously indicated the perforations should not be smaller than about 250 microns. Also, as previously indicated the percent open area for proper bait leaching should be no less than 35%, with the preferred range being in the vicinity of 45 to 55%.

In addition to the relationship between water temperature and desirable perforation size, the size of bait used will also determine, to a certain extent, the type of bag to be used. For example, with emulsified or minced bait or with roe, liver and other soft parts the recommended size would be closer to the minimums mentioned above. However, with whole fish, or coarse or bony parts it would be recommended to use a bait bag or container in which the perforations are close to the maximums suggested. A fisherman might thus carry several containers in each size range so that he could select therefrom the container most likely to be the most effective under the specific conditions in which he is fishing.

FIGS. 1 to 4 also illustrate the manner in which a bait bag according to the present invention might be closed and used in, for example, a lobster trap. As seen in FIGS. 1 and 2 a closure member is provided with a slot 18 extending therethrough from top to bottom, the slot also extending inwardly from one end and stopping short of the other end. The edges adjacent to the slot entrance may be rounded as at 20. The width of the slot 18 is slightly less than twice the thickness of the material of the bag wall 12 so that, when opposed edges of the bag are brought together, they may be slid into the slot 18, causing the two arms 22,24 of the member 16 to spread slightly and to consequently apply a closure or sealing force against the bag sides due to the resilient nature of the arms. The arms 22,24 are each provided with a bore 26 extending therethrough. Each of the opposed upper portions of the bag side wall 12 is also provided with an opening which, when the closure member is attached to the bait bag, will line up with the bores 26 so that a clear passage 28 is provided, extending from one side of the closure member to the other.

FIGS. 3 and 4 show how the bait bag might be located in a lobster trap 30 (FIG. 4). In FIG. 3 is seen a full bait bag 32 with the open end thereof closed off by a closure member 16 as described above. The through passage 28 has been mated with a tapering upright member 36 of a bait spindle 34, the spindle also including a radially enlarged base member 38. A rubber grommet or washer 40 is forced over the upright member 36 into engagement with the closure member 16 to help keep the assembly secured to the bait spindle 34.

As seen in FIG. 4 the assembly of FIG. 3 is located within the trap 30 in clear view of the entrance 42 to the trap.

While the present invention has been described in its preferred embodiment of a flexibly sided bag, it is clear that other forms of the invention could be constructed. For example, the container could have rigid sides and be in the form of a perforated cylinder or box which could sit on its own within a trap. Also, the material of the container could be of almost any nature as long as the criteria established with respect to the perforations are maintained. The material could be woven from strands of natural or synthetic fibers (for example of nylon) or it could be molded into an appropriate configuration.

Furthermore, it would be possible, although perhaps less desirable, to construct a bait container in which more than one size of perforation is utilized. For example, one could construct a flexible bag from two pieces of material joined along three edges thereof, with one piece have perforations of one size and the other piece having perforations of a second size. No matter how the container is constructed, however, it is necessary to satisfy the criteria respecting the most important aspects of the present invention, namely the size range of the perforations and the minimum open area defined by the perforations. Accordingly, the protection to be afforded by the present invention is to be determined from the claims appended hereto.

The embodiments of the invention in which an exclusive property or privilege is claimed are defined as follows:

1. A reusable container adapted for the controlled release of bait therefrom over an extended period of time during trap fishing, said container having
    apertured side walls, the apertures therethrough being in the size range of about 250 to about 1,000 microns and the apertures comprising about 45 percent to 55 percent of the area of said side walls, said container being closed at one end and open at the other end for the filling thereof with bait;
    means for closing said open end when said container has been filled with bait, comprising an elongate closure member having a slot therein, said slot being open at one end and closed at the other, and being defined by two parallel arms, said arms clampingly receiving the side walls of said container; and
    means for holding said filled container relatively unmoveably within a crustacean fishing trap comprising a bore extending through said parallel arms of said closure member and alignable with openings in the side wall of said container to define a passage adapted to receive an upright member of a bait spindle.

2. The bait container of claim 1, wherein the size range of said apertures is between about 1,000 microns and about 800 microns, is between about 800 microns and about 600 microns, is between about 600 microns and 450 microns, or is between about 450 microns and 250 microns.

3. The bait container of claim 2, wherein the size of said apertures is in the range of about 1,000 microns to about 800 microns for water having a temperature of about 0° C. to 7° C., is in the range of about 800 microns to 600 microns for water having a temperature of about 7° C. to about 13° C., is in the range of about 600 microns to 450 microns for water having a temperature of about 13° C. to 18° C., and is in the range of about 450 microns to about 250 microns for water having temperatures above about 18° C.

4. The bait bag of claim 3, wherein the apertures are at the smaller ends of said aperture ranges for emulsified or minced bait, and are at the larger ends of said aperture ranges for whole or coarse bait.

5. A reusable bait bag adapted to contain a bait and to provide a controlled release of the bait therefrom over an extended time during trap fishing for crustaceans, said bag comprising:

a perforate flexible side wall including apertures being uniform in size and in a selected size range of between about 800 and 1,000 microns, about 600 and 800 microns, about 450 and 600 microns or about 250 and 450 microns, said apertures in each case comprising at least 45 percent to 55 percent of the flexible side wall area;

said flexible side wall defining a bag closed at one end and open at the other end; and means for selectively closing said open end of said bag when said bag has been filled with bait and for holding said filled container relatively immovable within a fishing trip, wherein said closing means comprises an elongated closure member having a slot extending therethrough, said slot being open at one end and closed at the other and being defined by two parallel arms, said arms receiving opposed side wall edges at the open end of said bag, said closure member having a bore extending through said arms and said opposed side wall edges of said bag having an opening therethrough so that when said opposed side wall edges are contained within said slot, said bore is aligned with said openings to define a passage receivable on a bait spindle, the assembly of said bait spindle and said bag being positionable within the crustacean trap.

* * * * *